United States Patent [19]

Freeburg et al.

[11] 4,131,849
[45] Dec. 26, 1978

[54] TWO-WAY MOBILE RADIO VOICE/DATA SHARED COMMUNICATIONS SYSTEM

[75] Inventors: Thomas A. Freeburg, Arlington Heights; Manohar A. Joglekar, Elk Grove Village; Lawrence R. Pajakowski, Schaumburg, all of Ill.

[73] Assignee: Motorola, Inc., Schaumburg, Ill.

[21] Appl. No.: 734,493

[22] Filed: Oct. 21, 1976

[51] Int. Cl.² .............................................. H04B 7/00
[52] U.S. Cl. ..................................... 325/54; 343/175; 325/57
[58] Field of Search ............... 343/175, 176, 177, 200, 343/201, 202; 179/15 BY, 2 DP, 2 E; 325/51, 54, 53, 55, 57; 340/146.1 BA

[56] References Cited

U.S. PATENT DOCUMENTS

| | | | |
|---|---|---|---|
| 2,378,298 | 6/1945 | Hilferty | 343/202 |
| 2,731,622 | 1/1956 | Doremus et al. | 325/57 |
| 3,376,509 | 2/1968 | Willcox et al. | 325/57 |

Primary Examiner—Benedict V. Safourek
Attorney, Agent, or Firm—James W. Gillman; Sangki Lee

[57] ABSTRACT

In a control circuitry for a two-way mobile radio voice/data shared communications system including a plurality of mobile stations with data and voice terminals, a base station, a dispatching station for voice and data, a voice/data processor interposed between the voice/data dispatching station and the base station, there is provided means for enabling transmission and reception of inbound and outbound voice and digital data signals between the base station and the mobile stations selectively to effect full-duplex voice/data shared communications.

5 Claims, 2 Drawing Figures

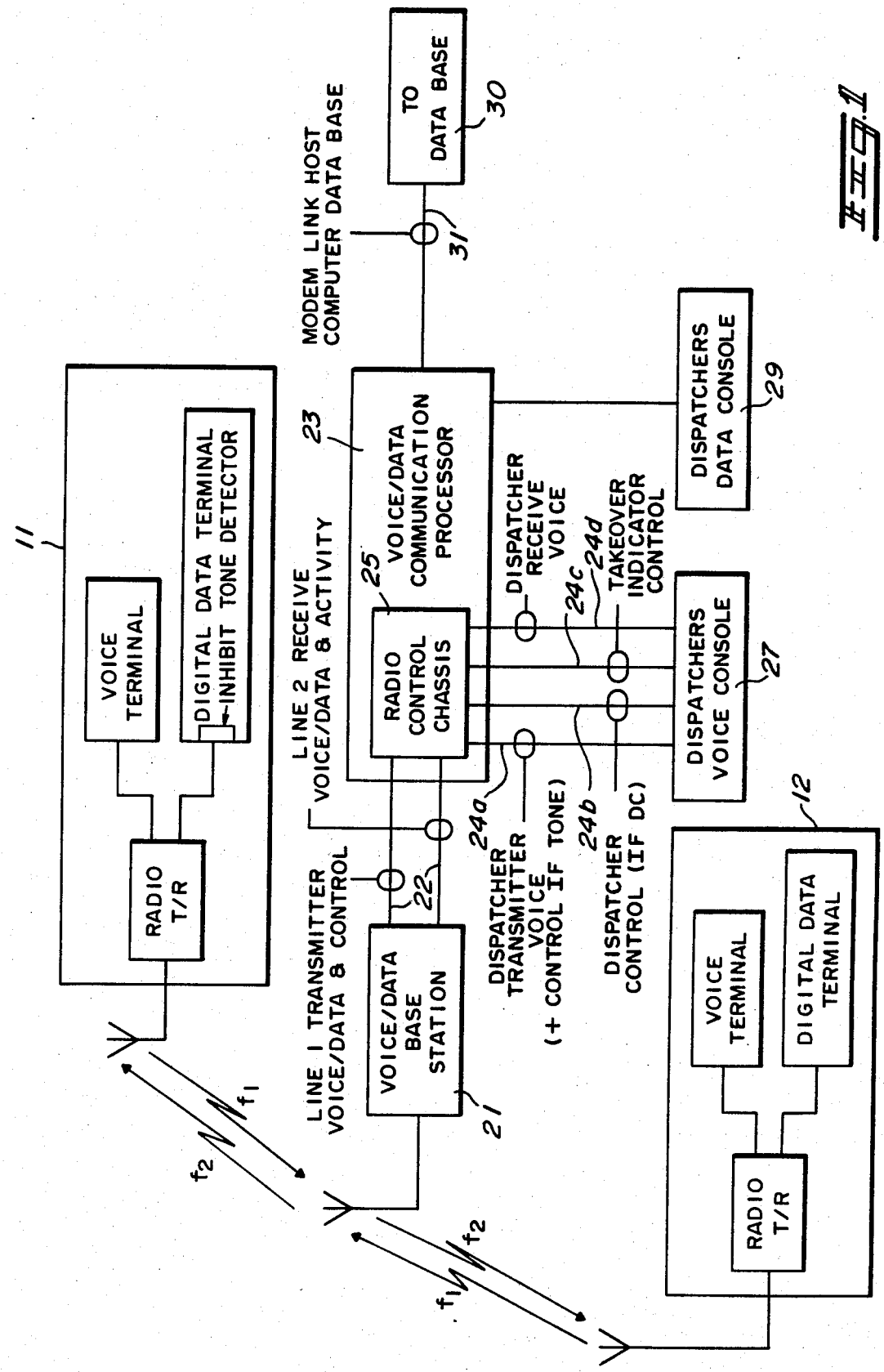

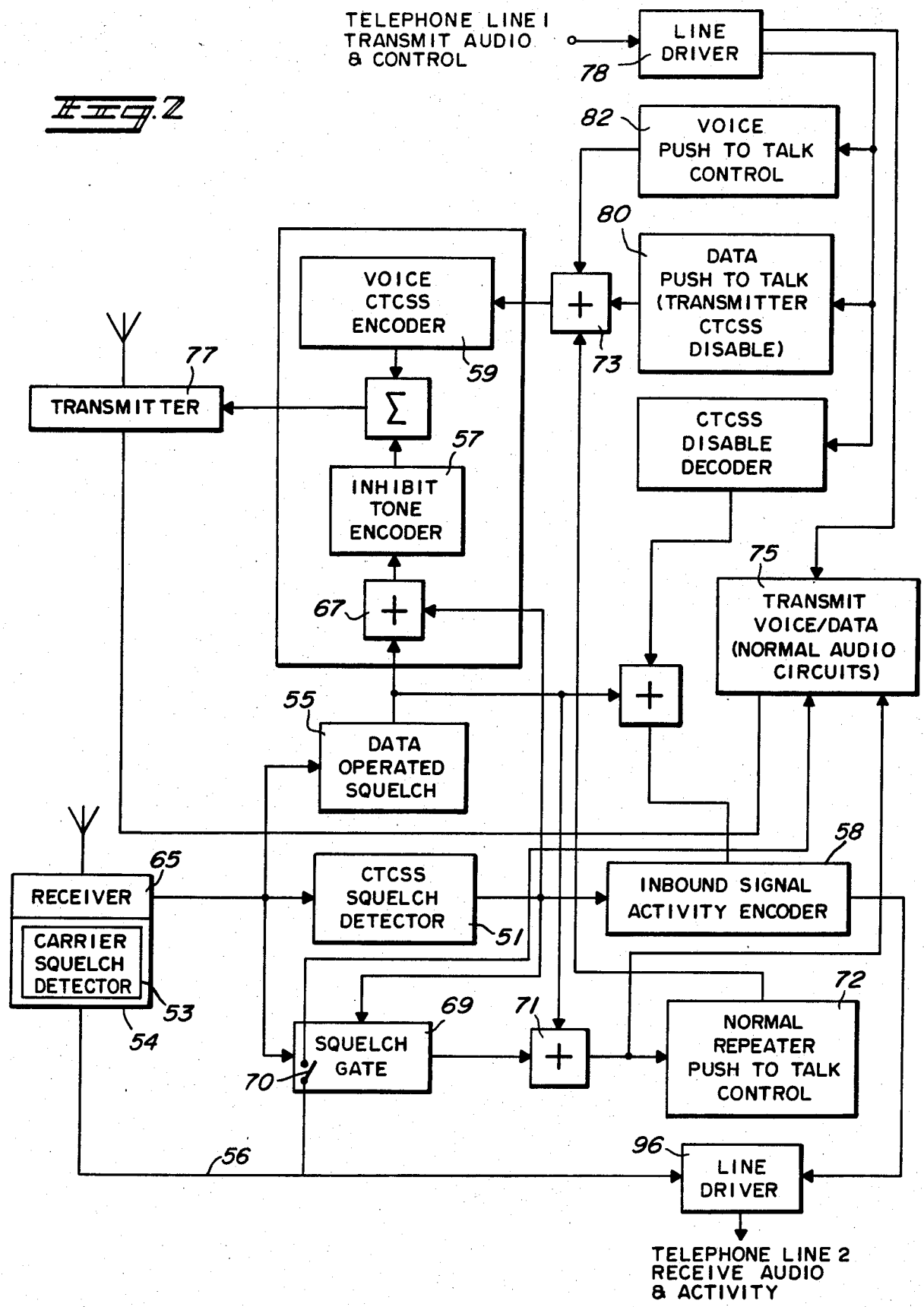

TWO-WAY MOBILE RADIO VOICE/DATA SHARED COMMUNICATIONS SYSTEM

PRIOR ART

Significant strides have been made in two-way mobile radio communications systems in recent years to meet the rapidly increasing demand. Typically such a system includes a base station and a plurality of mobile stations organized to provide radio communications services. Such a system is usually allocated with one frequency for inbound signals from the mobile station to the base station and another frequency for the outbound signal from the base station to the mobile stations. Until recently, most of the mobile radio communications need was met by a mobile radio communications systems designed to handle only voice signals.

However, with the emergence of the mobile digital data terminals, in more recent years, it was found possible to combine the mobile voice terminals with the mobile digital data terminal in a mobile station to provide voice as well as digital data communications capabilities. The digital data terminals met the need for the transmission and reception of written messages. This provided significant flexibility in mobile radio communications services in that it eliminated the need for a person to be present to receive incoming messages and freed him to tend to other tasks. This is especially found useful in the police two-way radio communications systems. For a detailed description of a mobile station that provides both the voice and digital data capabilities as described, one may refer to the U.S. Pat. No. 3,906,445 assigned to the present assignee.

However, prior art voice/data shared two-way mobile radio system is capable of operating only in a simplex mode, as far as the applicants are aware. Also, it has been found that the demand placed on the channel capacity of the system was compounded when digital data signal transmission was added. This was in addition to the fact that, as it were, already the communications handling capability of the system was often taxed to the limit to handle voice communications. So when the data terminals were added to the mobile stations, the capability of the channel was further taxed and throughput capacity of the system was taxed to the limit.

SUMMARY OF THE INVENTION

It is an object of the present invention to provide an improved mobile radio digital and voice shared communications system.

It is another object of the present invention to provide a full duplex voice/data shared radio communications system.

It is still another object of the present invention to increase throughput capacity of mobile radio communications system.

It is yet another object of the present invention to increase the reliability of the mobile radio communications system.

It is still another object of the present invention to combine two-way mobile radio voice systems with digital systems with minimum amount of changes so that they operate as a single integrated system.

It is yet further object of the present invention to provide improved data/voice shared two-way radio communications systems wherein the message integrety is maintained.

It is still another object of the present invention to provide a two-way mobile radio system wherein human fatigue involved in the use of the system is minimized.

It is yet another object of the present invention to provide a two-way radio communications system wherein the data communications and voice communications is provided in a duplex mode without interfering with each other.

The foregoing and other objects of the invention are obtained by providing a control circuitry in the base station of the communications system that permits or inhibits transmission of digital data and voice signals selectively in a way that enables the system to operate in a full duplex mode of operation.

According to a feature of the present invention there is provided a circuitry which inhibits transmission of inbound digital data from the mobile to the base station while an inbound voice signal is being transmitted from a mobile station to the base.

According to another feature of the present invention, there is provided a control circuitry that inhibits outbound digital data transmission when an outbound voice signal is being transmitted from the base station to a mobile station or vice versa. In this instance the circuitry still permits inbound transmission of voice or digital signal from the mobile station to the base station.

The foregoing and other objects and features of the present invention will be made clearer from the foregoing detailed description of an illustrative embodiment of the present invention in conjunction with the accompanying drawings.

BRIEF DESCRIPTION OF THE DRAWINGS

FIG. 1 shows a basic system block diagram of the two-way mobile radio voice/data shared system of the present invention.

FIG. 2 shows a detailed functional logic block diagram of the control circuitry in the base station that enables the system to operate in a full duplex mode.

DETAILED DESCRIPTION

As shown in FIG. 1 a mobile radio communications system includes a plurality of mobile stations (11, 12) each of which may include a mobile radio transceiver for transmitting and receiving RF digital data and voice terminals coupled to the tranceiver. The system includes a base station 21 for transmitting and receiving voice or digital data to and from the mobile stations. The base station 21 is coupled, via suitable paths 22, to a communications processor 23 that includes a control network commonly known as a radio control chassis 25. The chassis 25 is interposed between the base station and the dispatcher's voice 27 and digital data 29 consoles. Different paths 24a, 24b, 24c, 24d are used to couple the dispatcher's console 27 for voice transmission, reception, takeover or override control and dispatching function as well known. The digital data console may be in the form of CRT or teletypewriter or the like. The communications processor 23 is usually coupled, via a suitable conventional link 31, as illustrated in FIG. 1, to a data base 30 for providing data sought by mobiles and dispatchers.

In a typical application where the aforedescribed mobile radio communications is used by law enforcement agencies such as police departments: a police officer travelling in a car equipped with the mobile station may request certain data from the computer data base. This, he does by keying in an inquiry at the mobile data terminal requesting an information to the data base. The inquiry is appropriately modulated, by a carrier frequency, $f_1$, received, demodulated and sent to the control processor and thence to the dispatcher console and to the data base. The response to the querry is transmitted back to the mobile station carried by the outbound carrier, $f_2$, and the answer is displayed on the display means. Voice communications between a voice terminal and dispatcher takes place in a similar manner between the dispatcher and mobile stations.

There are certain problems associated with prior art mobile two-way radio voice/data shared communications systems. Although they are not apparent, they are very real and they impose on the mobile radio communications system severe constraints, especially on their throughput capacities. This is largely due to the fact that the mobile radio systems of the aforementioned type must operate within a particular frequency allocated for it by regulatary agencies such as, the Federal Communications Commission and that, heretofore, the systems have been designed to operate on simplex mode.

This can be appreciated by the fact that inbound channel carrier frequency, $f_1$, and an outbound channel carrier frequency, $f_2$, are used by all of the mobile stations associated with and serviced by the base station. Typically in the actual environment, more often than not, more than one mobile station tries to transmit voice or data signals to the base station at a given instant, while at the same instant, the dispatcher may demand the channel, $f_2$, to transmit data or voice. Inasmuch as the same frequency channel frequencies ($f_1$, $f_2$) are used by all of the inbound and outbound data and voice signals, unless control is exercised the signal channels will be a garbled mixture of signals and cause failure of the system to provide effective communication. Various queing techniques are used to overcome or sequence demands for the channel that take place simultaneously. However, this does not handle nor is concerned with the task of increasing the throughput.

The kind of duplex communication needed for in the two-way mobile voice/data shared systems to operate in a full duplex mode will now be highlighted by specific situations that the systems encounter in operation in handling signal transmission.

A situation is this: Suppose an inbound voice message is coming in from a mobile station to the base station. While the voice is coming, transmission of any other voice or digital data message from any other inbound mobile terminals to the base station must be inhibited. At the same time, however, the system must be capable of transmitting outbound digital data or voice messages.

Another situation is this: Suppose an inbound digital data is coming in from a mobile. When this happens, the system must be able to inhibit transmission of any other digital data or voice from any of the mobile stations to the base station. However, in this instance, voice override should be provided so that the dispatcher can handle emergency and other situations. This feature is incidentally required by the governmental agencies. In this instance also, outbound digital data as well as voice transmission must be permited while inbound data is coming in.

Still another situation is when outbound voice is being transmitted from a base station to a mobile station. In this case, the system must be capable of transmitting the voice signals to all of the mobile stations, as generally provided. In addition, the system must be capable of inhibiting the transmission of digital data from the base station to the mobile stations when the voice signal is being transmitted from the base to the mobile stations. This is so because the same frequency is used for both the transmission of digital data as well as voice from the base to the mobile stations. Also while the voice signal is going out, the system must also permit transmission of digital data from any of the mobile stations to the base station.

Still another situation is where outbound digital data is being sent out from the base station to a mobile station. The system must be capable of inhibiting transmission of voice as the outbound digital data are being transmitted to a mobile station. However, a voice override feature must be also provided as in the preceding situation. In this situation, while digital data is being sent out, the system must also permit any of the mobile stations to transmit voice or data messages to the base station and enable the base station to receive them.

A conventional two-way mobile radio communications system is not capable of providing all of the communications tasks set forth above. Restated, no conventional voice/data shared two-way mobile radio communications system is capable of rendering two-way mobile voice/data shared communications services in a full duplex mode as described in the four situations described above as far as the present inventors are aware.

FIG. 2 illustrates an inventive control circuitry of the present invention that enables the two-way radio communication systems to operate in a full duplex mode to provide the aforementioned communications tasks. Before the operation of the control circuitry is described, functions of certain functional block elements, especially those added to the existing conventional systems, of the control circuitry will be described.

Referring to FIG. 2, there is shown a continuous tone codes squelch system detector 51, hereinafter referred to also as CTCSS detector. The function of the CTCSS detector is to detect inbound voice transmission from a mobile station equipped with a CTCSS line encoder. A CTCSS encoder is a generally known circuitry which generates a signal in a subaudible region indicating that a voice signal is about to be transmitted and is present during the entire voice transmission. For a more detailed description of such a CTCSS encoder, one may refer to Electrical Industries Association Specification RS 220. Typically, aforementioned conventional CTCSS squelch detector takes about 130 milliseconds to detect the presence of CTCSS code from the time it is presented to the base station first.

As it is generally known, carrier squelch detector 53 is provided in a carrier squelch control circuitry 54 to detect the presence of RF carrier and ususally the detector is provided in the receiver itself. Its function is similar to that of CTCSS squelch detector except to handle carrier.

Data operated squelch circuit 55 detects the presence of digital data messages in the incoming signal coming from a mobile station equipped wth a data squelch encoder. Its typical detect time is 30 milliseconds and one may refer to a more detailed description of a data operated squelch circuit in U.S. Pat. No. 3,939,431 assigned to the present assignee. Inhibit tone encoder 57 is an encoding circuitry which generates an encoded signal to tell the mobile stations that there is an inbound data or voice signal and tell the mobiles stations not to send in any other data message. The tone inhibit signal as indicated by an inhibit tone detector provided in each of the digital data terminals disables the digital data terminals in the mobile stations so that they do not send out digital data while the mobile station is receiving the inhibit tone. This inhibit tone encoder is actuated to generate the inhibit code when inbound voice or inbound digital data is detected.

Voice CTCSS line encoder 59 is used to generate a signal to tell mobile stations that there is an inbound voice present from a mobile station to the base station. With the voice CTCSS encoder actuated, an inbound voice signal is rebroadcast and heard by all of the mobile stations. So the base station acts as a repeater to repeat and broadcast the incoming inbound voice message to all of the mobile stations.

The rest of the functional blocks of the control circuitry at a base shown in FIG. 2 is a well-known conventional type and will not be described separately. But their functions will be evident from the following description.

Now the operation of the control circuitry of the present invention provided in the data base station will be provided. The operation will be described in the context of the four situations described hereinabove in handling the communications tasks.

First, suppose there is an inbound voice signal from a mobile station to the base station. The voice signal comes into the receiver 65 and is sent to the dispatcher via audio path 56 and line driver 96 and communications processor 23 under the control of the CTCSS squelch detector 51 and inbound activity encoder 58 in a conventional manner. The voice CTCSS code is also detected by the CTCSS squelch detector 51. In turn, the CTCSS squelch detector provides an output which actuates inhibit tone encoder 57 via an OR gate 67 and the normal repeater push-to-talk 72 via a conventional squelch gate 69 and OR gate 71. The normal repeater 72 in turn causes voice CTCSS encoder 59 to be enabled via an OR gate 73. With squelch gate 59 activated, the inbound voice signal is transmitted through the path 56, a switch 70 provided in the squelch gate 69, and thence to audio circuits 75 and thence to transmitter 77, as generally known.

With the voice CTCSS encoder and inhibit tone encoder 57 activated in the aforementioned manner, the transmitter sends out an inhibit tone signal and voice CTCSS signal and rebroadcasts the inbound voice signal to the mobile stations via squelch gate 69 and audio circuits 75 and transmitter 77. In this manner the base station functions as an audio repeater and thereby broadcasts the incoming voice signal from a mobile station to all of the mobile stations. While this is taking place, the voice CTCSS and inhibit tone signals are sent from the base station to the other mobiles and the mobiles to inhibit all other mobile stations from transmitting voice or data. Also, digital data signal can be transmitted from the base station via a line driver 78 and transmit voice/data audio circuit 75 from the dispatcher's console 29 (FIG. 1). The system will interrupt the re-transmission of the incoming voice signal, as done in a conventional system, when the voice override feature is required.

The second situation is where digital data is being transmitted from a data terminal of a mobile station to the base station. The inbound data is received by the receiver 65 and its presence is detected by the data operated squelch circuitry 55. Circuitry 55 in turn actuates the inhibit tone encoder 57 to generate inhibit tone signal and the normal push-to-talk or repeater 72 via gate 71 to transmit the incoming digital signal to the transmitter 77 of the base station. Thus, incoming data signal is transmitted back to the mobile stations. Persons at the mobile stations will detect the presence of rebroadcast digital data signal, in the form of a hushing noise, although they will not be able to decipher the data signal content. This enables the persons in the mobile stations to realize that a mobile station is transmitting a digital message to the base station and alert them not to interfere. So they will not interrupt the inbound data transmission taking place unless an emergency situation exists. When an emergency exists, a person at a mobile station can cut in and override data signals. This is a well-known repeater operation of the system so that the dispatcher can interrupt and send out voice signals to mobile stations. Note that the digital data is retransmitted without the addition of the voice CTCSS signal. This allows the circuitry in the mobile radio to be arranged so that the user can hear the presence of the rebroadcast digital data only when he pulls out or unhooks his microphone and tries to transmit a voice signal. When he does this, he hears a hushing sound signifying to him that an inbound digital data from a base station is being rebroadcast by the base station.

The third situation is where an outbound voice signal goes out from a base station to a mobile station. The voice signal comes from the dispatcher's voice console 27 via radio control chassis 25. The voice signal actuates a conventional voice push-to-talk circuit 82 and circuit 82 in turn actuates voice CTCSS line encoder 59 to enable voice terminals in the mobile stations. The voice signal from the base station is transmitted via a voice/data normal audio circuit 75 and transmitter 77. The dispatcher's voice is then heard by all of the people at mobile stations. While the foregoing is taking place, the mobile stations can still send an inbound data or voice from any one of the mobile stations. Transmission of data from the base to the mobile is inhibited however by the radio control chassis function shown in FIG. 1.

The fourth situation is when an outbound digital data is sent out to a digital data terminal from the dispatcher's console 29 or data base 30 circuit. The presence of outbound data is detected by the data push-to-talk circuit 80. The digital data signal is permitted to go out via the transmit voice/data normal audio circuits 75 and the transmitter 77. The voice/data communications processor 23 is designed so that a dispatcher can interrupt and send out a voice signal via the line driver 78 and transmit voice/data audio circuit 75 and transmitter 77. This interrupts data transmission and the voice CTCSS encoder 59 sends a signal to all mobiles signifying that there is now a voice message present. When the dispatcher terminates his voice transmission, then the data transmission is resumed. This is a built-in transmission arrangement that gives voice preference over data transmission in a data/voice shared two-way radio communication system wherein the channel frequency is basically allocated to serve primarily for voice transmission. While the digital data is going out, incoming voice as well as incoming digital signal is permitted to come in via receiver 65 and line driver 96 and thence to voice/data processor and thence to the dispatcher's console or data base.

As described hereinabove, a data operated squelch detector 55 and CTCSS squelch 51 detector, voice CTCSS encoder 59 and inhibit tone encoder 57 are used in an advantageous manner in the control circuitry of the base station to enable a two-way mobile voice/data shared two-way radio communications system to operate in a full duplexed mode as described hereinabove which has not been possible heretofore.

In addition, the present invention provides the following advances to the art. Thus, for example, the throughput of the system is significantly increased by permitting the system to operate so that, while an inbound data coming in, a voice signal can go out and vice versa. This increases the throughput capacity of the system. There is no prior art two-way system which is capable of combining data and voice transmission in this manner.

The increase in the throughput capacity is also obtained by the fact that the data operated squelch circuit in the control circuitry is faster than CTCSS squelch decoder. The data operated squelch circuit of the aforedescribed U.S. Pat. No. 3,939,431 is found to require 30 milliseconds detection time as opposed to 120 millisecond detect time required by the conventional CTCSS squelch detector 51. When projected over many number of mobile stations of a system utilizing an allocated channel of limited bandwidth, savings in time taken for setting up communication paths is very significant. This in turn increases throughput of the system very significantly.

While the present invention is described in the context of an embodiment thereof hereinabove, other changes and modifications may be by persons of ordinary skill without departing from the spirit and scope of the present invention.

We claim:

1. A control circuitry for a two-way mobile radio voice/data shared communications system including a plurality of mobile stations with data and voice terminals, a base station, a dispatching station for voice and data, a voice/data processor interposed between the voice/data dispatching station and the base station, said control circuitry including:
   means for enabling the base station to receive the inbound voice signal from a mobile station and rebroadcast the inbound voice signal to the other mobile stations,
   means responsive to the inbound voice signal for inhibiting transmission of digital data signal from any of the mobile terminals to the base station, and
   means for independently transmitting outbound digital data or voice signal from the dispatching station.

2. The control system according to claim 1, including:
   means for enabling the base station to receive an inbound digital data from a mobile station and rebroadcasting the inbound digital data to other mobile stations in the absence of the inbound voice signal,
   means responsive to the inbound digital data for inhibiting transmission of any digital data from any other mobile station, and
   means for overriding the rebroadcasting of the inbound digital data in order to permit transmission of voice signals to the mobile stations from the dispatching station.

3. The control circuitry according to claim 2, including:
   means for sending out an outbound voice signal from the base station to the mobile stations,
   means responsive to the outbound voice signal for inhibiting the transmission of digital data from the base station to the mobile station while the outbound voice signal is being transmitted from the base station to the mobile stations, and
   means for permitting transmission of digital data or voice from any of the mobile stations to the base station independently of transmission of outbound voice signal.

4. The circuitry according to claim 1, including:
   means for permitting transmission of digital data to a mobile station from the base station, and
   means for overriding the outbound digital data transmission to permit voice transmission from the dispatching station to the mobile stations while permitting transmission of inbound voice or digital data signals from any of the mobile stations to the base station.

5. The control circuitry according to claim 1, including:
   means for sending out an outbound voice signal from the base station to the mobile station,
   means responsive to the outbound voice signal for inhibiting the transmission of digital data from the base station to the mobile station while the outbound voice signal is being transmitted from the base station to the mobile stations, and
   means for permitting transmission of digital data or voice from any of the mobile stations to the base station independently of transmission of outbound voice signal.

* * * * *